(12) United States Patent
Lin

(10) Patent No.: US 7,143,130 B2
(45) Date of Patent: Nov. 28, 2006

(54) PORTABLE MULTI-TRACKING METHOD AND SYSTEM

(76) Inventor: Ching-Fang Lin, 888 Easy St., Simi Valley, CA (US) 93065

( * ) Notice: Subject to any disclaimer, the term of this patent is extended or adjusted under 35 U.S.C. 154(b) by 584 days.

(21) Appl. No.: 09/733,859

(22) Filed: Dec. 8, 2000

(65) Prior Publication Data

US 2001/0032236 A1 Oct. 18, 2001

Related U.S. Application Data

(60) Provisional application No. 60/242,405, filed on Oct. 21, 2000, provisional application No. 60/235,766, filed on Sep. 26, 2000, provisional application No. 60/209,640, filed on Jun. 5, 2000, provisional application No. 60/169,779, filed on Dec. 9, 1999.

(51) Int. Cl.
*G06F 15/16* (2006.01)

(52) U.S. Cl. ............... 709/203; 709/243; 701/213; 701/220; 701/208

(58) Field of Classification Search ........... 340/303, 340/961; 348/116, 231; 455/518, 41, 457; 701/301, 200, 117, 220; 725/116; 342/386, 342/25 F; 702/5
See application file for complete search history.

(56) References Cited

U.S. PATENT DOCUMENTS

| | | | | |
|---|---|---|---|---|
| 5,848,373 A | * | 12/1998 | DeLorme et al. | 701/200 |
| 5,872,526 A | * | 2/1999 | Tognazzini | 340/961 |
| 5,894,323 A | * | 4/1999 | Kain et al. | 348/116 |
| 5,907,293 A | * | 5/1999 | Tognazzini | 340/903 |
| 5,983,161 A | * | 11/1999 | Lemelson et al. | 701/301 |
| 6,037,893 A | * | 3/2000 | Lipman | 342/25 F |
| 6,037,991 A | * | 3/2000 | Thro et al. | 725/116 |
| 6,208,936 B1 | * | 3/2001 | Minor et al. | 701/220 |
| 6,317,605 B1 | * | 11/2001 | Sakuma | 455/457 |
| 6,385,461 B1 | * | 5/2002 | Raith | 455/518 |
| 6,456,854 B1 | * | 9/2002 | Chern et al. | 455/457 |
| 6,480,783 B1 | * | 11/2002 | Myr | 701/117 |
| 6,525,768 B1 | * | 2/2003 | Obradovich | 348/231.99 |
| 6,720,920 B1 | * | 4/2004 | Breed et al. | 342/386 |
| 6,834,234 B1 | * | 12/2004 | Scherzinger et al. | 702/5 |
| 2004/0097195 A1 | * | 5/2004 | Selleck | 455/41.3 |
| 2004/0148090 A1 | * | 7/2004 | Melen | 701/200 |

FOREIGN PATENT DOCUMENTS

JP    2000-357296    * 12/2000

* cited by examiner

*Primary Examiner*—David Wiley
*Assistant Examiner*—Dustin Nguyen
(74) *Attorney, Agent, or Firm*—Raymond Y. Chan; David and Raymond Patent Group

(57) ABSTRACT

A method and system for multi-tracking among independent individuals without a monitoring center, where an individual is a person, a vehicle, or any other property, enables the individuals to be networked in a group and each individual to search and track other individuals of interest. The portable multi-tracking system is also capable of tracking personnel inside a building, where a self-contained positioning device provides continuous carrier's position information. In the open area a GPS (Global Positioning System) unit is activated to provide precision absolute position data which can be blended with the self-contained data to improve the accuracy and robustness of the positioning services. Thus the present invention provides excellent position tracking outside a building.

63 Claims, 12 Drawing Sheets

PORTABLE MULTI-TRACKING METHOD AND SYSTEM

CROSS REFERENCE OF RELATED APPLICATION

This is a regular application of a first provisional application having an application Ser. No. of 60/169,779 and a filing date of Dec. 9, 1999, a second provisional application having an application Ser. No. 60/209,640 and a filing date of Jun. 5, 2000, a third provisional application having an application Ser. No. 60/235,766 and a filing date of Sep. 26, 2000, and a fourth provisional application having an application Ser. No. 60/242,405 and a filing date of Oct. 21, 2000.

BACKGROUND OF THE PRESENT INVENTION

1. Field of the Invention

The present invention relates to remote tracking processing, and more particularly to a method and system for multi-positioning-and-tracking, voice and video communication via the Internet. Each multi-tracking device can obtain the location information of each individual in a group and track him in real time. Each multi-tracking device can communicate one another in voice. Equipped with a mini-camera the video can be transferred forth and back among those people equipped with the tracking device.

2. Description of Related Arts

There is a demand for determining another person's or vehicle's location anywhere and anytime. The current technology utilizes a monitoring center equipped with computers and communication links. The persons or vehicles tracked send their position data via the communication link to the monitoring center. The monitoring center is capable of displaying their current locations on a display unit in real time. The monitoring center can also perform command and control tasks to dispatch personnel or vehicles under tracking. A typical such application is the fleet tracking system. This tracking system also has the capability to recover the stolen or lost vehicle or hijacked personnel.

SUMMARY OF THE PRESENT INVENTION

A main objective of a portable multi-tracking method and system of the present invention is to acquire the current locations of individuals of interest. These individuals' locations are displayed with a map as background on the acquirer's display unit. The invention allows any person or vehicle with a display unit to display their position and the relative positions of any other persons or vehicles of interest.

It is a further objective of the present invention to provide a portable multi-tracking method and system, in which the position data from the positioning module is shared with other individuals via a public network, such as the Internet.

It is a further objective of the present invention to provide a portable multi-tracking method and system, in which a self-contained miniature IMU (inertial measurement unit) is used along with a GPS (global positioning system) receiver to deliver uninterrupted positioning data for each individual.

It is a further objective of the portable multi-tracking method and system of the present invention for multi-tracking among independent individuals without a monitoring center, where an individual is a person, a vehicle, or any other property. With this system, the individuals are networked in a group, and each individual can search and track other individuals of interest. Equipped with a powerful self-contained micro IMU (Inertial Measurement Unit), this system is capable of tracking personnel inside a building, where the micro IMU provides continuous carrier's position information. In the open area a GPS (Global Positioning System) unit is activated to provide precision absolute position data which can be blended with the IMU data to improve the accuracy and robustness of the positioning services. Thus the present invention provides excellent position tracking outside a building.

It is a further objective of the portable multi-tracking method and system of the present invention to provide individuals' locations which are overlaid on a digital map on the host's display unit. The host is at the center of the display, thus the relative locations of other individuals are displayed on the host's display unit. The networked individual can send messages to each other as well.

It is a further objective of the present invention is to provide the portable multi-tracking method and system, which can be applied for tracking of family members, tracking of cab vehicles of a taxi company, and tracking of law enforcement officials pursuing criminals or suspects. In a military environment, the soldiers in a regiment can track each other during military missions by using the present invention. The pilots of aircraft in a formation can use the multi-tracking system to maintain formation flight and evade potential collision.

DETAILED DESCRIPTION OF THE PREFERRED EMBODIMENT

Figure 1:
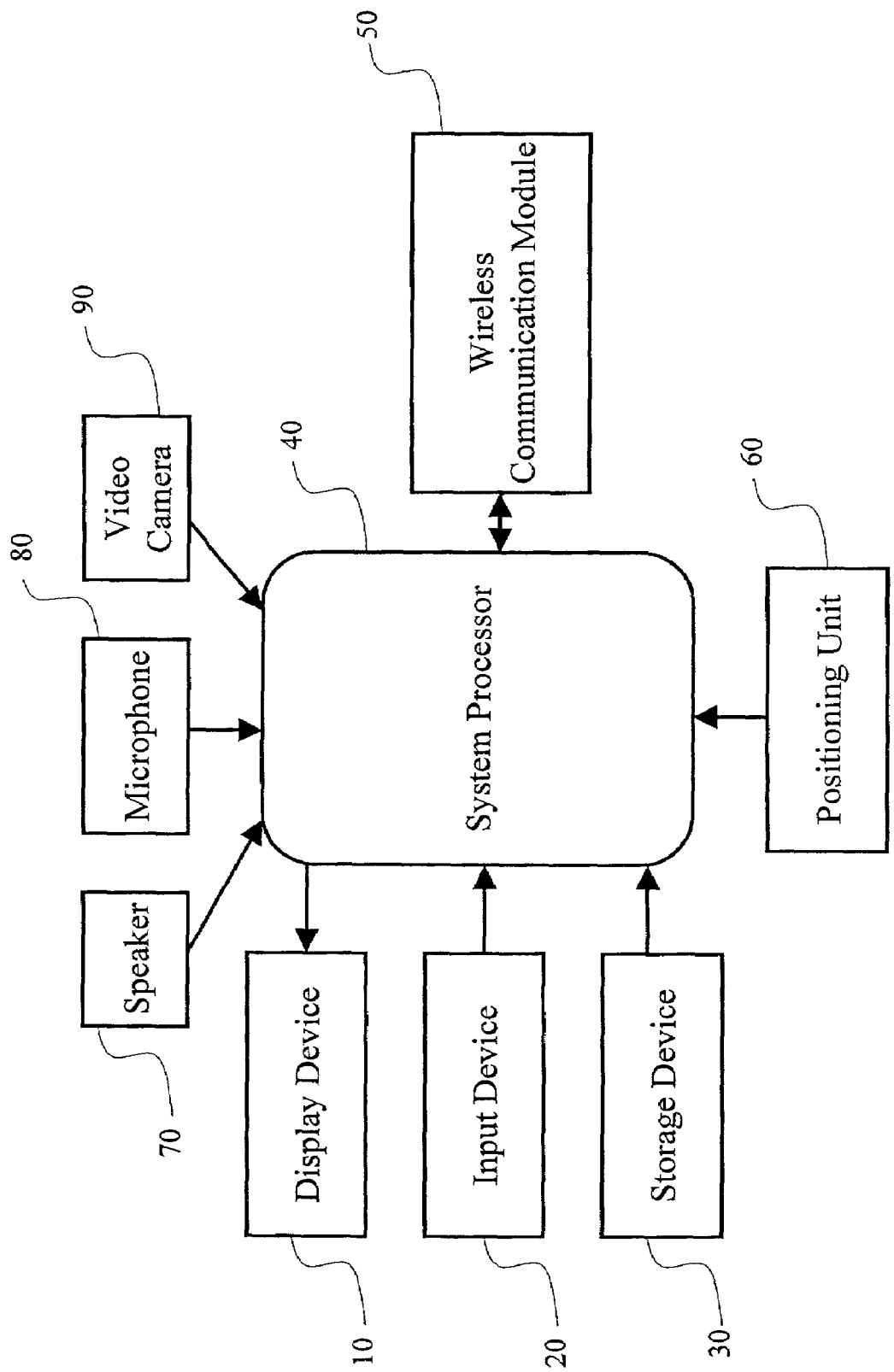
FIG. 1 shows a unit for a portable multi-tracking system according to a preferred embodiment of the present invention, where a positioning unit generates position data of the carrier and a wireless communication module is responsible for networked position data exchange.

Referring to FIGS. 1 to 12, a portable multi-tracking method and system according to a preferred embodiment of the present invention is illustrated, which is provided for multi-tracking processing by using a public network such as the Internet, where the Internet is responsible for location and command data exchanging between individuals among a group. The individual is a person, a vehicle, or any other property. With this system, the individuals are networked in a group, and each individual can search and track other individuals of interest. The present invention also is equipped with a powerful self-contained micro IMU (Inertial Measurement Unit), which is capable of tracking personnel inside a building, where the micro IMU provides continuous carrier's position information. In the open area a GPS (Global Positioning System) unit is activated to provide precision absolute position data which can be blended with the self-contained micro IMU data to improve the accuracy and robustness of the positioning services. Thus the present invention provides excellent position tracking outside a building.

The IMU/GPS integrated device, in general, is costly and big in size. Weight, and large size lead to a not feasible deployment in a car or for being carried by a single individual. With the emergence of the MEMS (MicroElectronicMechanical System) technology, a miniature IMU based on MEMS technology becomes an embracible reality.

The micro IMU to be embodied in the preferred embodiment of the present invention is invented by the applicants, referring to U.S. patents pending, "MicroElectroMechanical System for Measuring Angular Rate", Ser. No.: 60/154,700; "Processing Method for Motion Measurement", Ser. No.: 09/399,980; "Angular Rate Producer with MicroElectroMechanical System Technology", Ser. No.: 09/442,596; and "Micro Inertial Measurement Unit", Ser. No.: 09/477,151. Besides, the applicants also invented a "coremicro" IMU to be capable of employed in the present invention, which is currently "The world's smallest" IMU, which is based on the combination of solid state MicroElectroMechanical Systems (MEMS) inertial sensors and Application Specific Integrated Circuits (ASIC) implementation. The "coremicro" IMU is a fully self contained motion-sensing unit. It provides angle increments, velocity increments, a time base (sync) in three axes and is capable of withstanding high vibration and acceleration. The "coremicro" IMU is opening versatile commercial applications, in which conventional IMUs can not be applicable, including land navigation, automobile navigation, personal hand held navigators, robotics, marine vehicles and unmanned air vehicles, various communication, instrumentation, guidance, navigation, and control applications.

The portable multi-tracking method according to the preferred embodiment of the present invention includes the following steps:

(1) Provide a plurality of portable multi-tracking units, wherein one of the portable multi-tracking units acts as a host unit while the other portable multi-tracking units act as client units.

(2) Provide host position data of the host unit from a positioning unit, wherein the positioning unit can be a GPS receiver, an IMU positioning device, or an integrated GPS/IMU device. The position data is a three dimensional vector of (x, y, z) coordinates in the Earth-Centered-Earth-Fixed (ECEF) coordinate system, or of (latitude, longitude, altitude) coordinates in the Geodetic coordinate system.

(3) Receive client position data and client identification of the client units by a wireless communication module through a wireless communication public network, such as the Internet, where the wireless communication module creates and maintains a communication link with other individuals. The data received from the wireless communication module include other individuals' position data, their identifications (IDs), inquiring commands, and other messages.

(4) Send the host position data and a host identification of the host unit by the wireless communication module through the wireless communication public network so that other individuals can access these data.

According to the preferred embodiment of the present invention, the step (1) further comprises the following steps:

(1.1) Retrieve map data from a map database stored in a storage device of each of the portable multi-tracking units to provide a map.

(1.2) Display the map on a displaying unit of each of the portable multi-tracking units.

Also, the step (2) further comprises the steps of processing the host position data to achieve the host location and displaying the host location of the host unit on the map on the displaying unit of the host unit.

The step (3) further comprises the steps of decoding the client locations received from the client units to achieve the client locations thereof and displaying the client locations of the client units on the map on the displaying unit of the host unit.

The step (4) further comprises the steps of decoding the host location received from the host unit to achieve the host location by each of the client unit, and displaying the host location of the host unit on the map on the displaying unit of each of the client units.

Moreover, the step (1) further comprises a step of receiving user commands from an input device, wherein the input device can be a keyboard, a touch screen, a pen coupled with a character recognition system, or a voice recognition device. The user commands include: viewing a map, displaying other individuals' locations relative to the host, sending messages, scheduling trip, activating autonomous navigation functionality, and locating an address.

The portable multi-tracking method of the present invention further includes the steps of:

(a) collecting voice data from a microphone;
(b) encoding the voice data by the system processor;
(c) sending the encoded voice data to the wireless communication module so that other multi-tracking device can access the voice data;
(d) receiving encoded voice data from the wireless communication module;
(e) decoding the voice data by the system processor; and
(f) sending the decoded voice data to a speaker so that the user can hear what other people are talking.

Alternatively, the portable multi-tracking method of the present invention may further include the steps of:

(a') collecting video image from a video camera;
(b') encoding the video image by the system processor;
(c') sending the encoded video image to the wireless communication module so that other multi-tracking device can access the image data;
(d') receiving encoded video image from the wireless communication module;

(e') decoding the video image by the system processor; and (f') sending the decoded video image to the display so that the user can watch what other people are doing.

Each individual has a user ID which can be an identification code or name of the user. All the user IDs of the individuals who log on the server are listed. Each user of the portable multi-tracking system can select a specific individual by choosing his/her ID on the list to view his/her location. Each user of the portable multi-tracking system can also select multiple individuals by choosing their user IDs on the list to view their location.

The portable multi-tracking system provides an option for the user to disable or enable the accessibility. When the accessibility is enabled, other individuals can access his/her location information. When the accessibility is disabled, other individuals can not access his/her location information.

Individuals are grouped into different user groups. Each user group has a group identification number or name. One of the individuals in a user group is selected as a group server of that user group to receive the locations from individuals in that user group and then broadcasts the locations to the individuals in the same user group so that the individuals know their locations with each other. An individual can access another individual in the same user group but cannot access individuals in a different user group.

The portable multi-tracking system provides an option for the user to select user group of interest. It also provides an option for the user to create a user group so that other individuals can enter into this group.

According to the present invention, as shown in FIG. 1, the portable multi-tracking system comprises a display device 10, an input device 20 (such as a keyboard, or a touch screen), a storage device 30 (such as a CD-ROM, a hard drive, or a flash memory embedded in the computing platform), a system processor 40 (such as a palm PC, a laptop computer, or a specific computing platform), a positioning unit 60, a wireless communication module 50, a speaker 70, a microphone 80, and a video camera 90.

The display device 10 is connected to the system processor 40. The system processor 40 outputs the map data to the display device 10. The display device 10 is responsible for displaying the map to the user. The map data is retrieved by the system processor 40 from the storage device 30 which is connected to the system processor 40. The map data is stored in the storage device 30 in a specific format and is called electronic map database. The electronic map database provides digital data of the streets, buildings, rivers, mountains, and other terrain information.

The system processor 40 also outputs other individuals' position data to the display device 10, where other individuals' position data is retrieved from the wireless communication module 50. Other individuals' locations are overlaid on the electronic map so that the user knows where other individuals are and their relative position profile.

The input device 20 is connected to the system processor 40 and acts as an interface for the user to intervene in the system operation. The input device 20 can be a regular or modified keyboard which can receive character inputs from the user. The input device 20 can also be a software keyboard coupled with a character recognition system so that the user can use a stylus to input characters. The input device 20 can also be a touch screen coupled with corresponding software to identify the commands sent from the user. The input device 20 can also be a microphone coupled with a voice recognition system to receive commands from the user.

The storage device 30 is connected to the system processor 40 and used for storing electronic map database, and/or other interim data such as the location and IDs of other individuals from the wireless communication module 50. The storage device 30 can be a CD, a hard drive, or a flash memory.

The system processor 40 is a central processing unit coupled with necessary interfaces to the display device 10, the input device 20, the storage device 30, the positioning unit 60, and the wireless communication module 50. The system processor 40 is responsible for processing sensor positioning data, display processing, input response, remote data or command processing, sending messages, and device control and management.

The wireless communication module 50 is connected to the system processor 40. The wireless communication module 50 is used to process wireless communication protocol, wireless signal detection, received data conversion, signal data amplification, modulating a digital signal to be transmitted into an analogue signal, and demodulating an analogue signal into a digital signal. The wireless communication module 50 further comprises an antenna for converting an analogue signal into a radiative signal or converting a detected radiative signal from a remote device (such as another portable multi-tracking system) into an analogue signal which is suitable for the wireless communication module to process.

The positioning unit 60 is connected to the system processor 40 and generates the current position data of the host. The position data comprises of position, velocity, and heading. The positioning unit 60 can be a GPS receiver, an IMU, or the combination of a GPS receiver and an IMU. In the open area the GPS receiver is a good candidate for generating position data. The IMU is preferred to be the micro IMU or "coremicro" IMU and can be used in a building to provide robust position data for the carrier.

The positioning unit 60 can be a MEMS (MicroElectronicMechanicalSystem) inertial sensor which generates position data. The MEMS techniques offer tremendous cost, size, reliability, power consumption improvements for guidance, navigation, and control systems, compared with conventional inertial sensors.

The positioning unit 60 can be a land or water vehicle navigator which generates position data. The applicant invented a land and water navigator, U.S. patent application Ser. No. 60/167830, "Vehicle Self-Carried Positioning Method and System Thereof", which is used to determine position information on land and in water with high accuracy. The land and water navigator invention has evolved from the "coremicro" IMU patent pending. The navigator can receive but not rely on the GPS signal and DGPS signals for highly accurate positioning solution. Without GPS/DGPS signals, the land and water navigator also provides a highly accurate positioning solution, such as an accuracy of better than 1 percent of the distance traveled. The land and water navigator is a right positioning system with reasonable size and weight and power consumption for commercial vehicle operation, which can be used in areas where GPS signals are not available, such as tunnels, forested areas, urbanized terrain, and high Electronic Counter Measure (ECM) environments.

The positioning unit 60 can also be a hand-held navigator which generates position data. The applicants also invent a hand-held navigator, U.S. patent application Ser. No.

60/167825, "Self-Contained Positioning Method and System Thereof for Hand-Held Navigator", having reasonable size and weight and power consumption for hand-held operation to determine position for a user on land with high accuracy. The hand-held navigator invention has evolved from the "coremicro" IMU patent pending. The navigator can receive but not rely on the GPS signal and DGPS signals for highly accurate positioning solution. Without GPS/DGPS signals, the hand-held navigator also provides highly accurate positioning solution, such as an accuracy of better than 1 percent of the distance traveled. The hand-held navigator is the right positioning system with reasonable size and weight and power consumption for commercial applications, which can be used in areas where GPS signals are not available, such as tunnels, forested areas, urbanized terrain, and high Electronic Counter Measure (ECM) environments.

The microphone 80 is connected to the system processor 40. The microphone 80 detects sound and converts the sound wave to electrical signal. The electrical presentation of the sound is further sampled and converted into digital data. The digital data is processed by the system processor 40 to compensate noise and reduce data size. Then the digital data is encoded. The encoded digital sound data is sent to the wireless communication module 50. The wireless communication module 50 sends the encoded sound data to the network via Internet so that other individuals can access it.

The speaker 70 is connected to the system processor 40. The wireless communication module 50 receives encoded digital sound data via Internet and send it to the system processor 40. The system processor decodes the digital sound data and sends it to the speaker 70. The speaker 70 converts the digital sound data to analogue signal and then the analogue signal is converted to sound wave.

The video camera 90 is connected to the system processor 40. The video camera captures the video image can convert it to digital presentation. The digital presentation of the video image is sent to the system processor 40. The digital video image data is processed and encoded, and finally sent to the wireless communication module 50. The wireless communication module 50 sends the encoded video image to the network via Internet so that other individuals can access.

The wireless communication module 50 receives encoded digital video image via Internet and send it to the system processor 40. The system processor 40 decodes the digital video image data and sends it to the display device 10.

Figure 2:
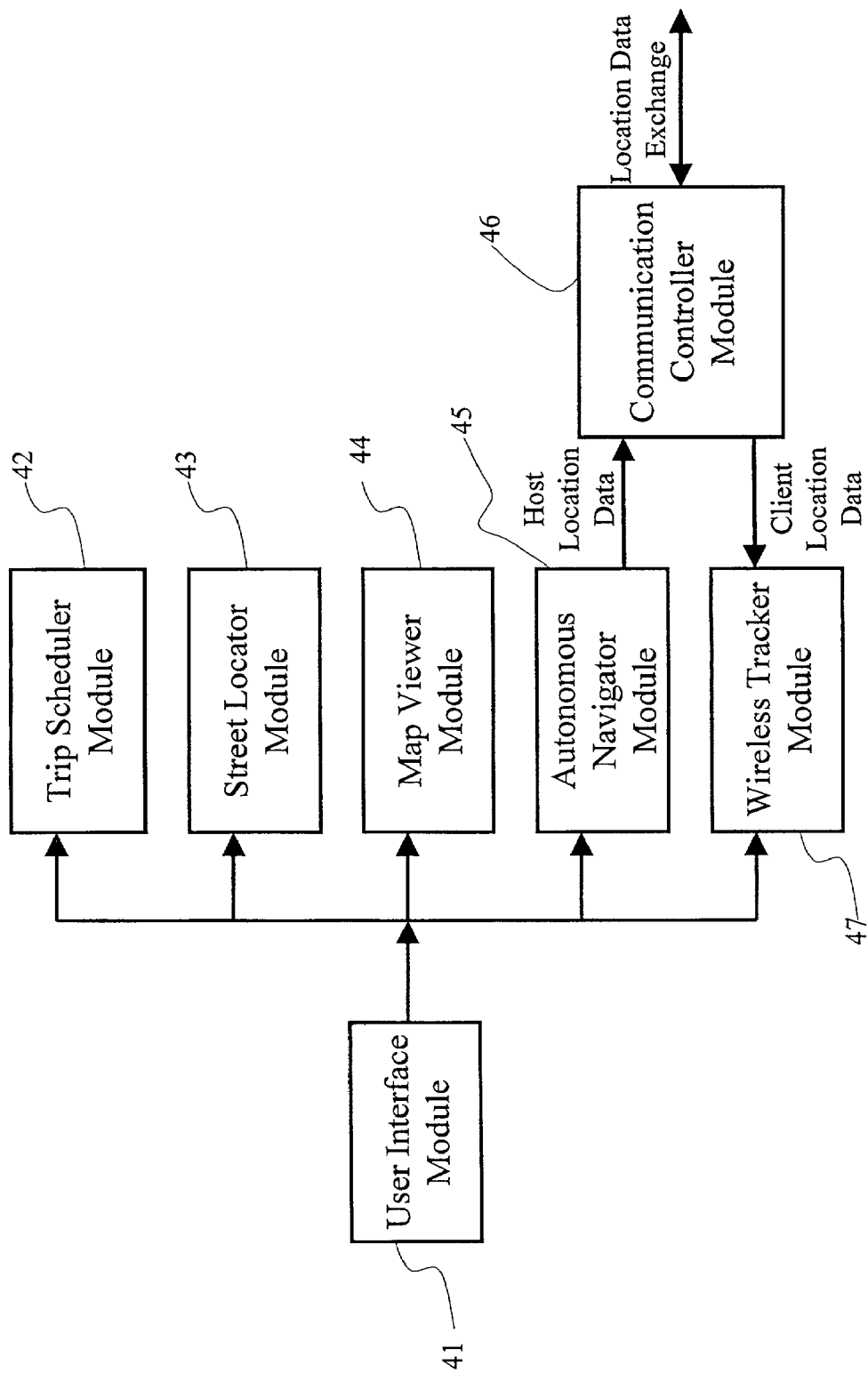
FIG. 2 is a block diagram illustrating the software system of the portable multi-tracking system according to the above preferred embodiment of the present invention, wherein a user interface module oversees each functional module.

The software system supporting the portable multi-tracking functionality comprises a user interface module 41, a trip scheduler module 42, a street locator module 43, a map viewer module 44, an autonomous navigator module 45, a wireless tracker module 46, and a communication controller module 47, as shown in FIG. 2. The user interface module 41 is an entry for the user to enable or disable the functions of wireless communication, multi-tracking, autonomous navigation, displaying map, locating an address, and scheduling a trip.

The user interface 41 provides an entry for user to select operation functions among position tracking, voice tracking, and video tracking. The voice tracking captures the host's message in voice fashion and sends it to the network via Internet. The voice tracking also receives voice data from Internet and speak it out the user. The video tracking captures the video image about the user and his surrounding environment and send it to the network via Internet. The video tracking also receives video data from Internet and displays it on the display device 10.

The trip scheduler module 42 plans and schedules the trip, including defining start point, interim points, and end point. Other information can also be logged, such as visiting time, appointments, contact persons, and comments.

The map viewer module 44 displays the map data on the display device 10. The map viewer can zoom in and out the area of interest with great accuracy, displays the position data (speed, direction, longitude, latitude, and height) of the host and other individuals in the network.

The street locator 43 searches a place or destination by address, name, position data, or a click on the map.

The autonomous navigator module 45 tracks and navigates wherever the user goes, shows the real-time speed and direction, illustrates no-map areas such as mountains, lakes, and rivers, gives a warning message if the user goes the wrong way, allows two-points or multi-point routing, provides street-to-street directions, shows time and distance to destination, and programs avoidable areas.

The autonomous navigator module 45 outputs the position data of the host to the communication controller module 47. The communication controller module 47 combines the host position data with the host's ID and sends them to the wireless communication module 50. The wireless communication module 50 is a combination of hardware and software and is responsible to send these data onto the network so that other individuals can access these data. The data stream sent from the host has an order as follows (in words):

(1) Time Tag in milliseconds: 1 word.
(2) ID: 1 word, when necessary it can be extended into 2 words to encompass more mobile users.
(3) Three dimensional location in Geodetic coordinate system, including Latitude in radians, Longitude in radians, height above sea level in meters. Each location component occupies 1 word.
(4) Three dimensional location in an earth-centered inertial coordinate system (ECIZ). Each location component occupies 1 word.
(5) Three dimensional velocity in an earth-centered inertial coordinate system (ECIZ). Each velocity component occupies 1 word.

The above motion parameters are sufficient for characterizing a ground vehicle to realize multi-tracking. When used for aircraft tracking, the message will be enhanced by adding the following information:

(6) Three dimensional acceleration in an earth-centered inertial coordinate system (ECIZ). Each acceleration component occupies 1 word.
(7) Rotation matrix from the earth-centered inertial coordinate system to the body coordinate system (BC).
(8) Three dimensional angular velocity in radians/second when the observer is in an earth-centered inertial coordinate system and the resolution is in the body coordinate system.
(9) Three dimensional angular acceleration in radians/second when the observer is in the earth-centered inertial coordinate system and the resolution is in the body coordinate system.

The communication controller module 47 also receives information from other individuals in a group and sends such information to the wireless tracker module 46. The wireless tracker module retrieves the individual ID and its position data and sends these data to the map viewer module 44. The map viewer module can display other individuals' locations on the electronic map. The wireless tracker module updates the tracking status of other individuals of interest at a constant period. It also alerts the user when losing track of a specific individual of interest. It also alerts for potential collision between the host and other individuals in the aircraft applications.

Figure 3:
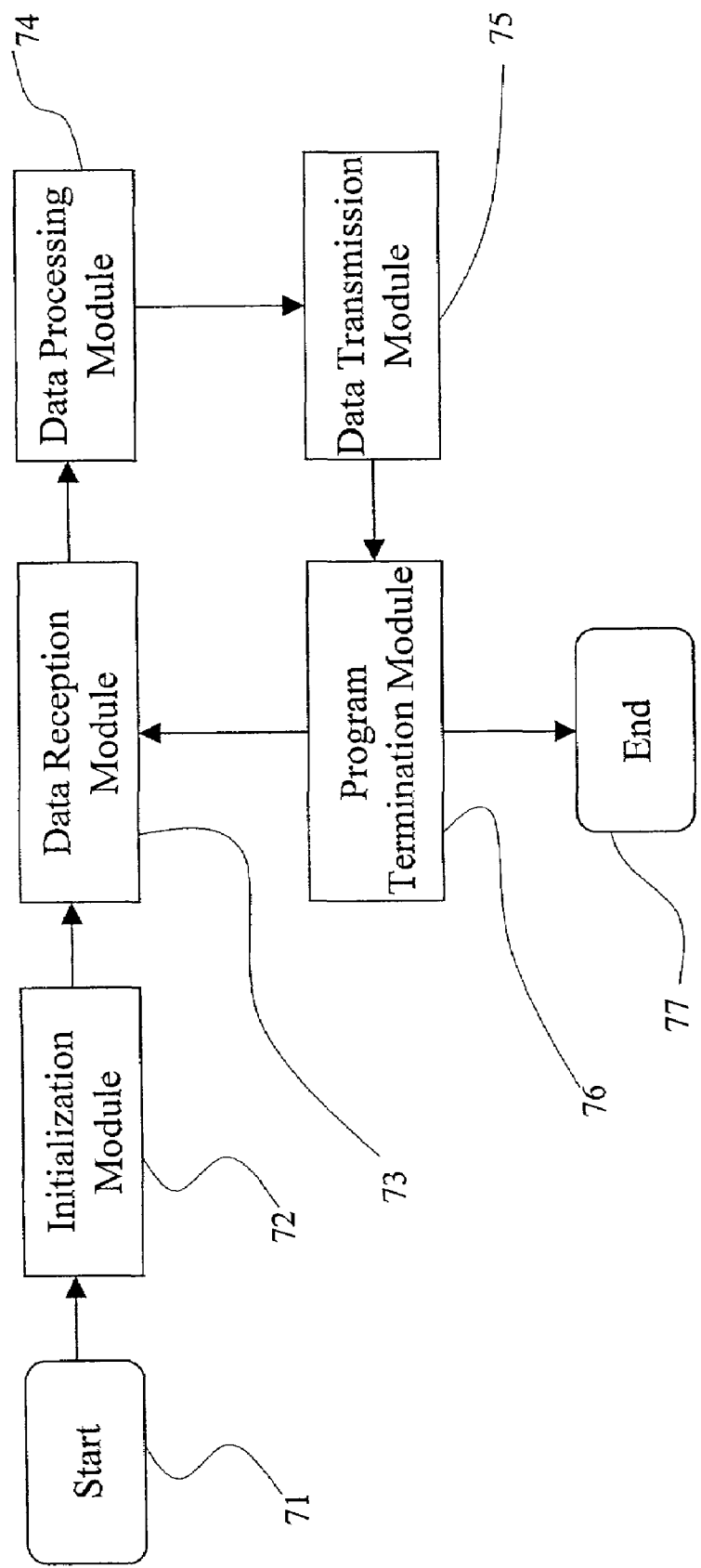
FIG. 3 is a block diagram illustrating the operation flow of the portable multi-tracking system according to the above preferred embodiment of the present invention.

As shown in FIG. 3, the multi-tracking mechanism in accordance with the present invention. It consists of a start module 71, an initialization module 72, a data reception module 73, a data processing module 74, a data transmission module 75, a program termination module 76, and an end module 77.

Figure 4:
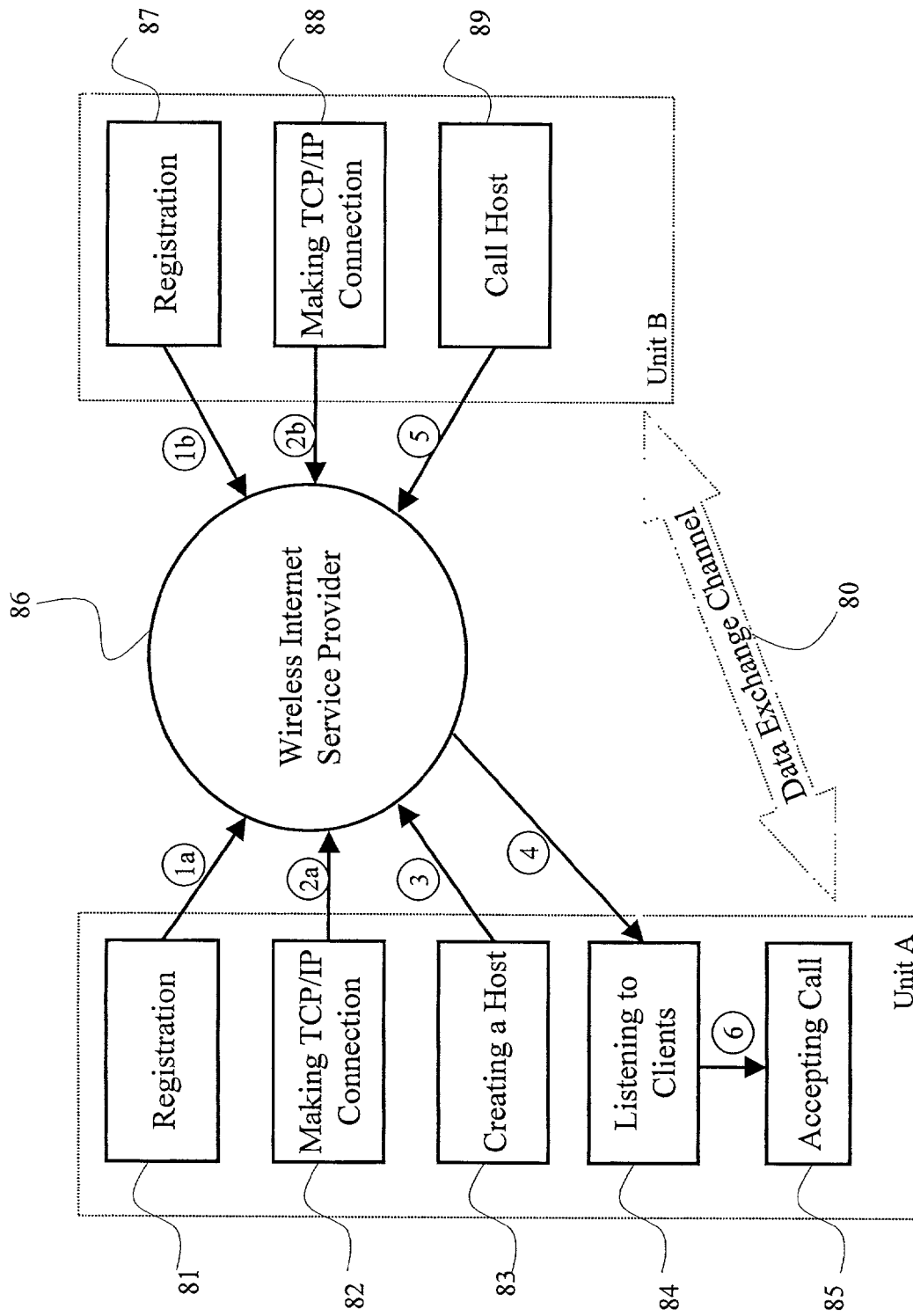
FIG. 4 is a block diagram illustrating the procedure for creating a data exchange channel between the server and client based on the Internet protocol according to the above preferred embodiment of the present invention.

As shown in FIG. 4, the mechanism for the creation of a communication link between individuals, where two individuals are illustrated. The starter for creating the communication link acts as a Server, which is marked as Unit A in FIG. 4. The responders act as Clients, which are marked as Unit B in FIG. 4. The communication is based on the TCP/IP technology.

The networking technologies have been advanced since the inventions of Ethernet, Token Ring, Fiber Distributed Data Interfaces (FDDI), X.25, Frame Relay, Switched Multimegabit Data Service (SMDS), Integrated Services Digital Network (ISDN), and Asynchronous Transfer Mode (ATM). The Internet protocols are the most popular technology for networking diverse vendor protocols.

The communication link of the present invention is built on the TCP/IP technology to realize portability and cost-effectiveness. The TCP (transmission control protocol) is a connection-oriented transport protocol that sends data as unstructured stream of bytes. In the TCP/IP architecture, the IP (Internet Protocol) is responsible for transferring packets of data from point to point, where each point is a communication link node. The TCP is responsible for verifying the correct delivery of data among points. The TCP can detect errors and specify retransmission until the data is correctly and completely received.

The wireless IP modems are candidates for creating the communication link between the portable multi-tracking systems. Each multi-tracking unit carries one IP modem with a unique IP address. Based on the unique IP address the multi-tracking unit in a group can recognize each other.

FIG. 4 shows the process for creating the data exchange channel between the server (Unit A) and client (Unit B). Both the server and client have to register with the wireless Internet service provider 86. Each one will be assigned an IP address, which is a unique ID for each device. An example for IP address is 166.129.081.165. Each one will also be notified by a primary DNS server IP address or a secondary DNS server IP address for dialing-up to the wireless Internet service provider. An example for a primary DNS server IP address is 206.138.237.235, and an example for a secondary DNS server IP address is 206.138.237.234.

According to the present invention, a process of creating a data exchange channel or link between the server and client includes the steps of:

(1a) registering the Unit A with the wireless Internet service provider, where the wireless Internet service provider must support the hardware and software protocol employed in the Unit A;

(1b) registering the Unit B with the wireless internet service provider, where the wireless internet service provider must support the hardware and software protocol employed in the Unit B, wherein the implementation of hardware and software in Unit B does not have to be the same as that in Unit A;

(2a) making TCP/IP connection between the Unit A and the wireless internet service provider, wherein a dial-up network software can be used to perform such an operation and the Unit A obtains a data transferring channel by making a TCP/IP connection with the wireless internet service provider;

(2b) making a TCP/IP connection between the Unit B and the wireless Internet service provider, wherein a dial-up network software can be used to perform such an operation. Unit B obtains a data transferring channel by making the TCP/IP connection with the wireless Internet service provider;

(3) creating a host on the Unit A, wherein the host is a central communication node through which position information can be exchanged among multiple clients;

(4) listening to clients by the host on the Unit A, wherein the host listens to requirements for logging on the network from clients;

(5) calling host by the Unit B, wherein the client sends requirements for logging on the communication network; and (6) accepting call by the host on the Unit A to build the data exchange channel between the Unit A and the Unit B, where the Unit A acts as a Server and the Unit B as a Client.

The above steps (1a), (1b), (2a), and (2b) can be randomly changed but conforming to the following rules:

Rule 1: Step (1a) must be executed before step (2a).
Rule 2: Step (2a) must be executed before step (3).
Rule 3: Step (1b) must be executed before step (2b).
Rule 4: Step (2b) must be executed before step (5).

Figure 5:
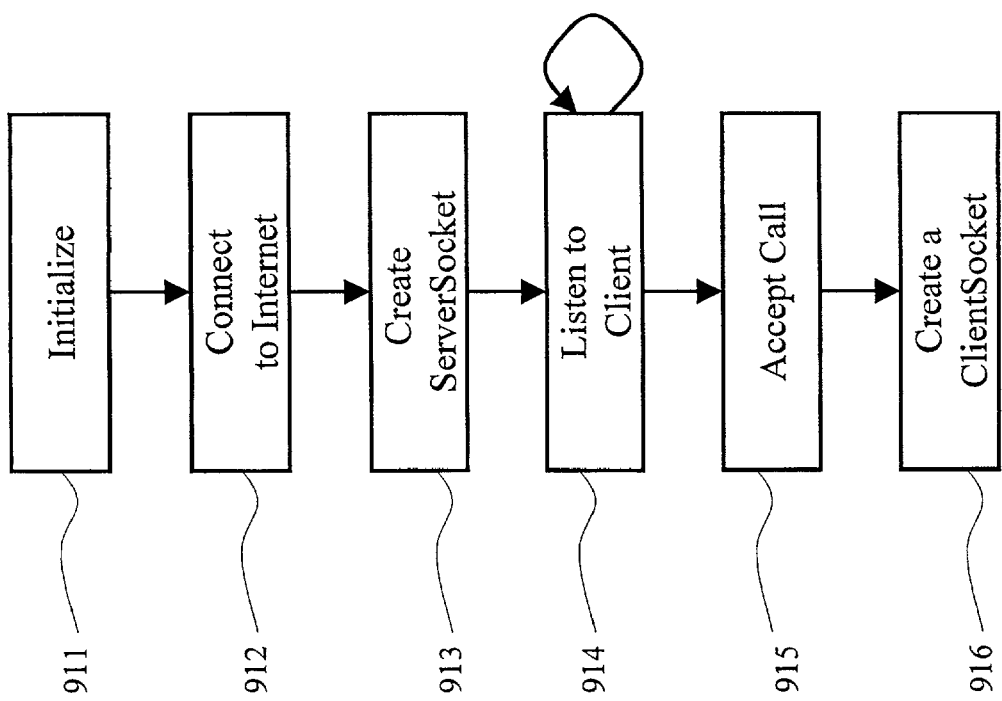
FIG. 5 is a block diagram illustrating the procedure on the server end by using socket according to the above preferred embodiment of the present invention.
Figure 6:
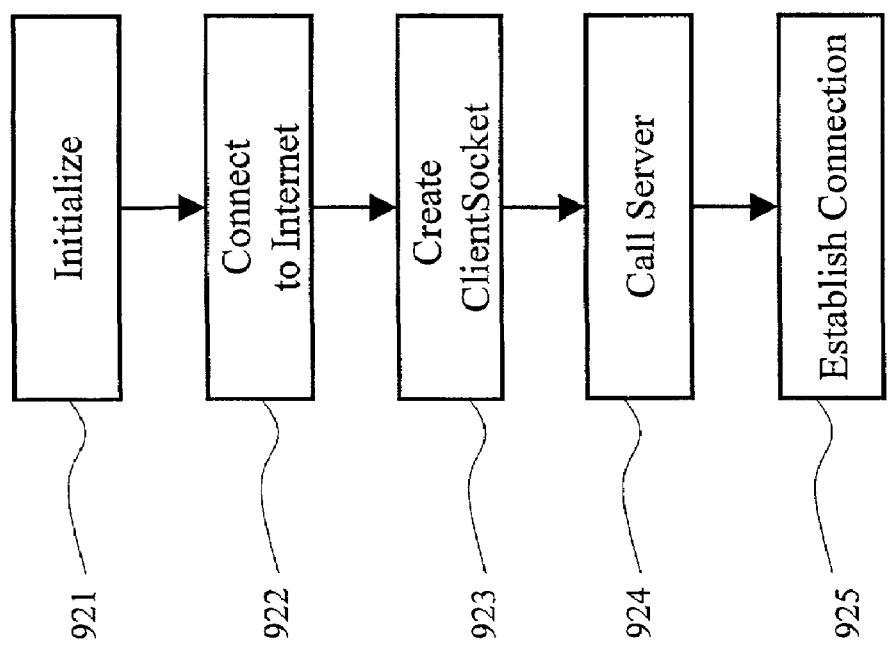
FIG. 6 is a block diagram illustrating the procedure on the client end by using socket according to the above preferred embodiment of the present invention.

As shown in FIG. 5, in order to create the communication link by using a socket, the server performs the following steps:

First, initialize system parameters and associated registers, which is indicated by 911.

Second, the server connects to the Internet. This can be done by using dial-up software. This dial-up software dials up the Internet service provider, and keeps a communication channel with the Internet service provider.

Third, after connecting to the Internet service provider, the server creates a ServerSocket which is a subroutine provided by the computer operating system.

Fourth, the server listens to calls from clients. When the server detects a call from a client, the server accepts the call, and creates another socket called ClientSocket which is used to communicate with the client.

On the other hand, when the client tries to contact the server, first, the client initializes the system parameters and associated registers;

second, does the same thing as the server does: dials up the Internet service provider, and keeps a communication channel with the Internet service provider;

third, after connecting to the Internet service provider, the client creates a ClientSocket which is a subroutine provided by the computer operating system; and fourth, the client calls the server at the server's IP (Internet Protocol) address, wherein when the server accepts the call, a wireless communication link is established between the server and the client.

When the server is communicating with clients, it is still listening so that it can accept multiple calls from multiple clients. When the server receives calls from different clients, it creates different ClientSockets to handle the communication task with different clients. This methodology makes it a right solution for networked multi-tracking processing.

Each client sends its location and ID to the server, and the server broadcasts this information to the group to realize the multi-tracking among a group.

Figure 7:
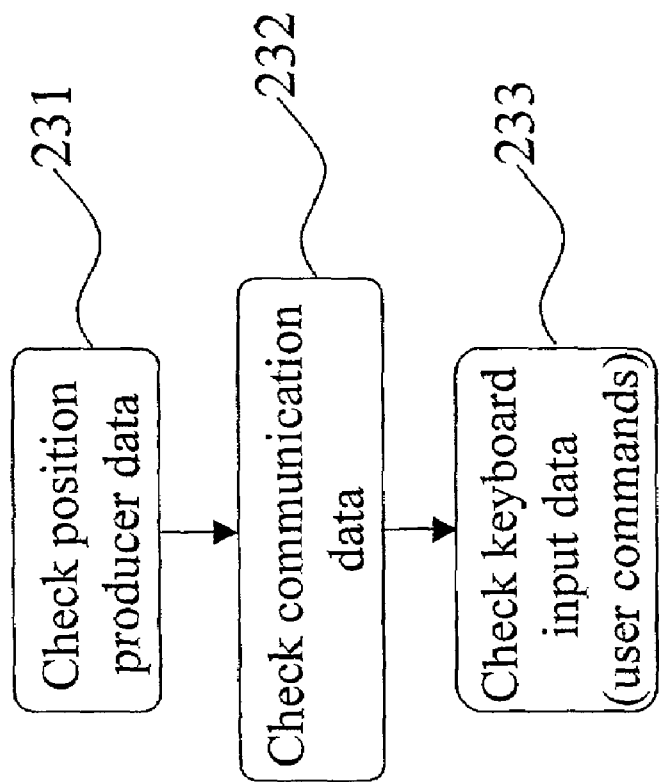
FIG. 7 is a block diagram illustrating the process engine for the data reception module according to the above preferred embodiment of the present invention.

FIG. 7 illustrates a process engine for the data reception module 73, as shown in FIG. 3, which comprises three functional modules: namely a position producer data reception module 231, a communication data (or remote data) reception module 232, and a user input data reception module 233. All three modules are executed in a synchronous fashion, and communicate with each other.

Figure 8:
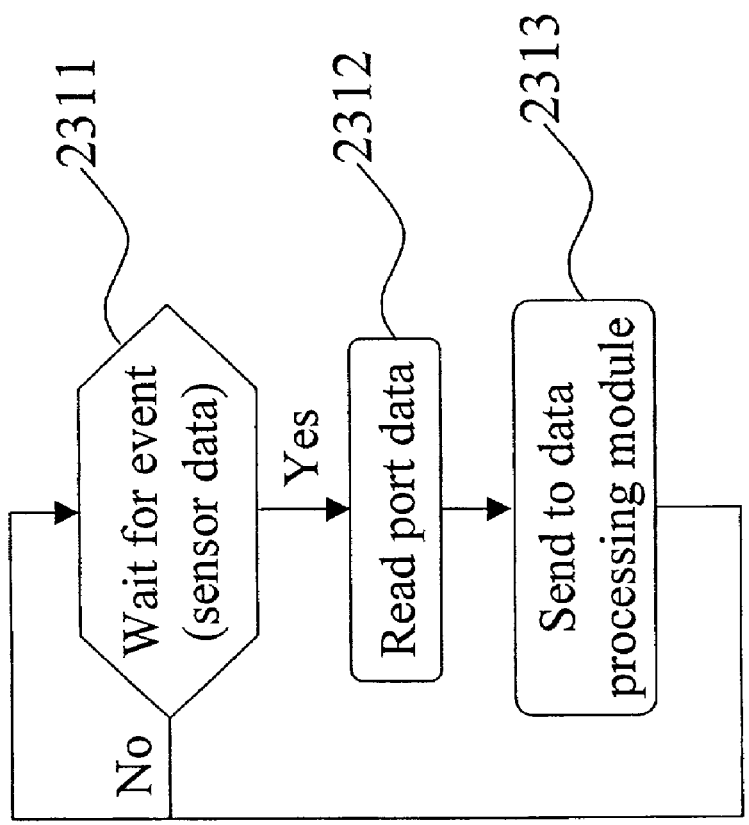
FIG. 8 is a block diagram that further extends the process of the position producer data reception module according to the above preferred embodiment of the present invention.

As shown in FIG. 8, the position producer data reception module 231, as shown in FIG. 7, further comprises three functional modules: a synchronous module 2311, a port data reading module 2312, and a communication module 2313. The synchronous module 2311 is designed to wait for an event that shows that new position data is ready without wasting the system processing time.

Figure 9:
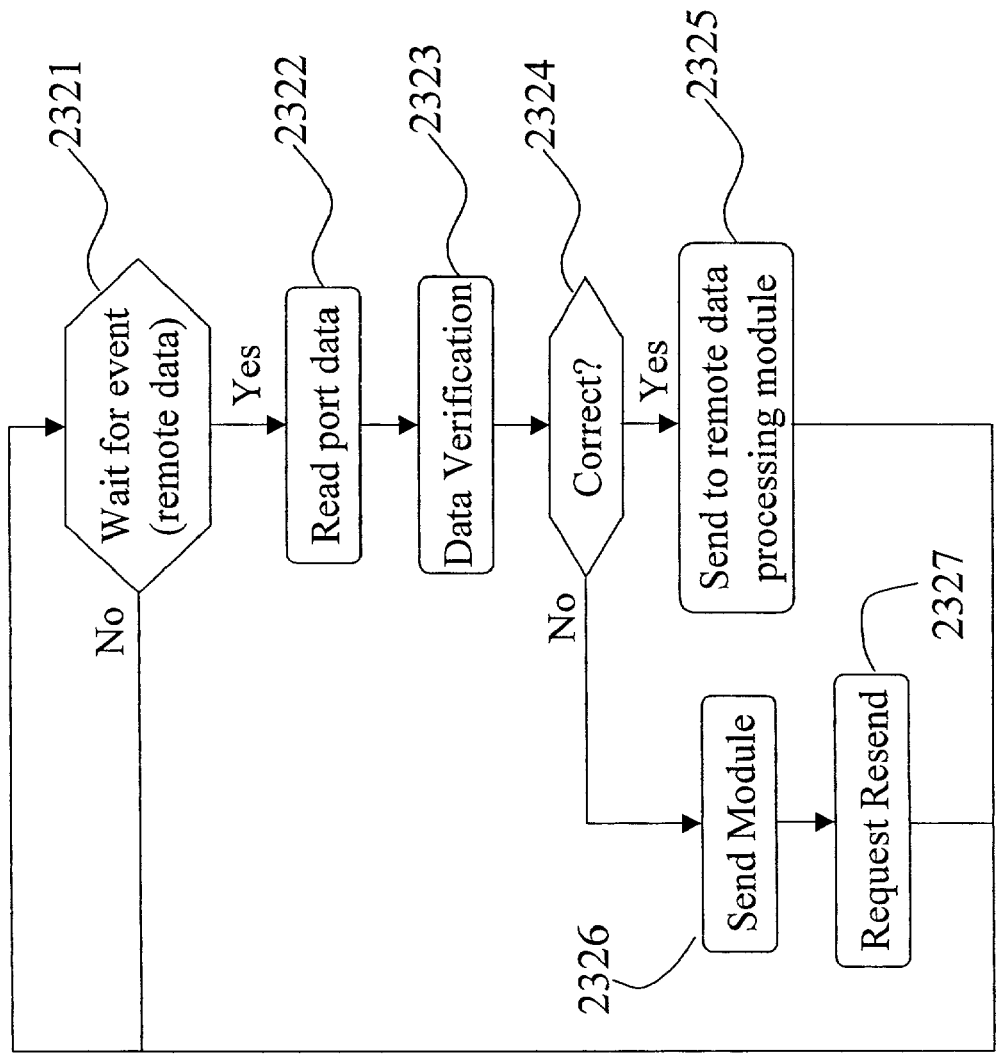
FIG. 9 is a block diagram that further extends the process of the communication data (or remote data) reception module according to the above preferred embodiment of the present invention.

As shown in FIG. 9, the communication data (or remote data) reception module 232, as shown in FIG. 7, further comprises a synchronous event module 2321, a communication port data reading module 2322, a data verification module 2323, an error checking and recovering module 2324, a data transfer module 2325, a send module 2326, and a request module 2327 with a remote device. The data transfer module 2325 is a type of synchronous module that communicates with a remote data processing module.

Figure 10:
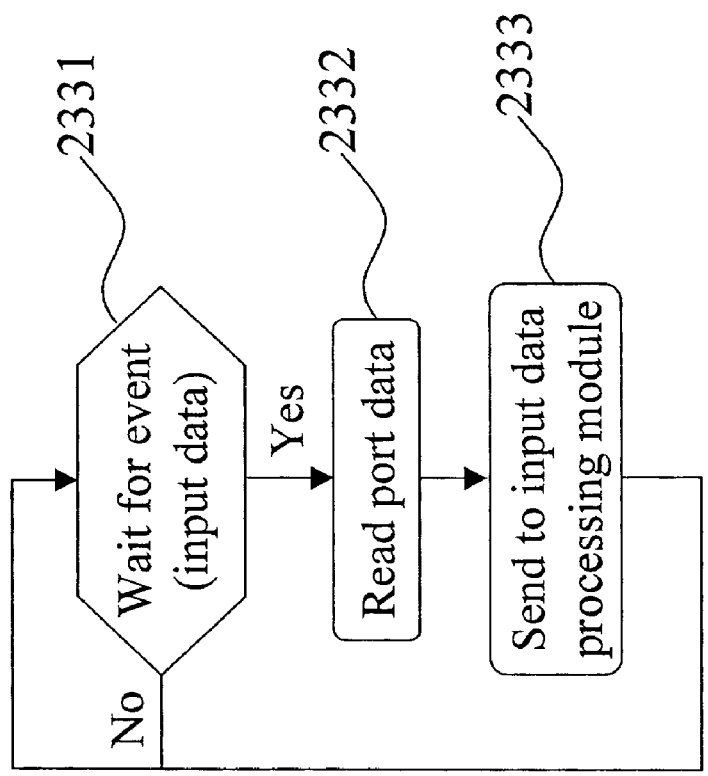
FIG. 10 is a block diagram that further extends the process of the user input data reception module according to the above preferred embodiment of the present invention.

As shown in FIG. 10, the user input data reception module 233, as shown in FIG. 7, further comprises three modules: a synchronous module 2331, a port data reading module 2332, and a communication module 2333 among the other processing threads in the system such as data processing module. The synchronous module 2331 is designed to wait for an event that shows that a new position data is ready without wasting the processing time of the system processor unit 12 as shown in FIG. 2 to search the port continuously.

Figure 11:
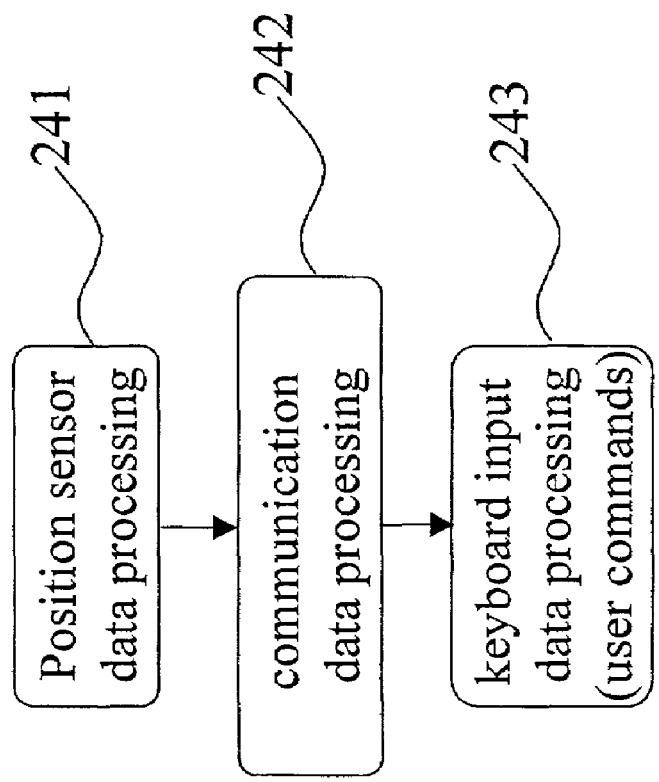
FIG. 11 is a block diagram that further details the process of the data processing module according to the above preferred embodiment of the present invention.

As shown in FIG. 11, the data processing module 74, as shown in FIG. 3, further comprises three modules: a position sensor data processing module 241, a communication data processing module 242, and a user input data processing module 243.

Figure 12:
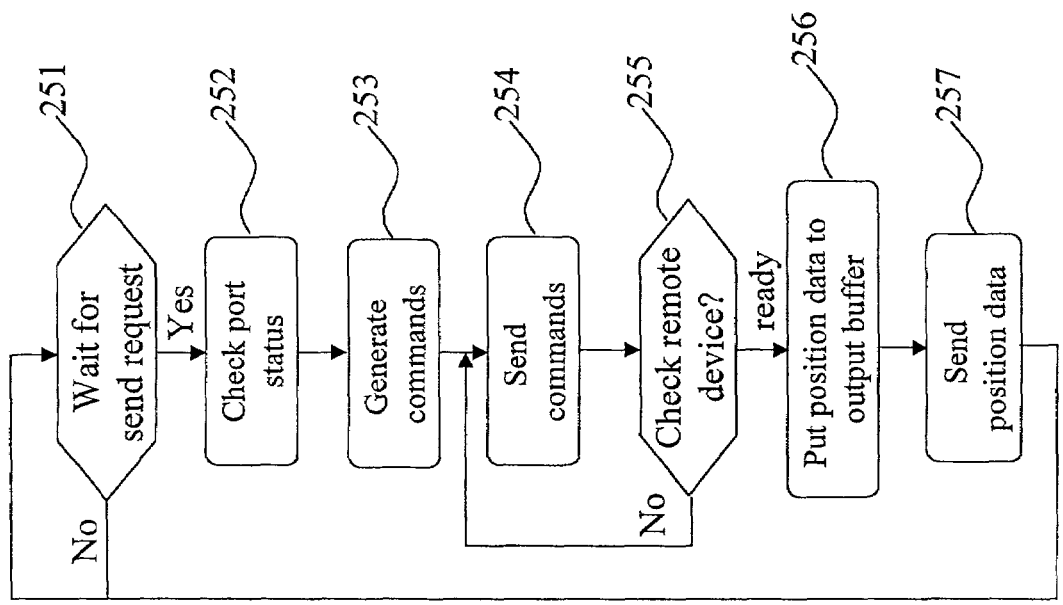
FIG. 12 is a block diagram that further details the process of the data transmission module according to the above preferred embodiment of the present invention.

As shown in FIG. 12, the data transmission module 75, as shown in FIG. 3, further comprises a synchronous sending request module 251, a communication port status checking module 252, a communication command generation module 253, a communication command sending module 254, a remote device checking module 255, a synchronous module 256 to write the data to be sent to the output data buffer, and a data sending module 257.

The portable multi-tracking system provides life and property security functionality. The user can send messages including the carrier's location to the other multiple tracked carriers and the emergency center or user service provider simultaneously. So that when an emergency happens, the other multiple tracked carriers can help to send the messages to the emergency center or user service for the carrier that encountered an emergency. Message categories can include accidents, vehicle problems, robberies, kidnappings, etc. This application can be very broad and covers old people, children, handicapped people, airplanes, boats, nature exploration, hunting and fishing, etc.

When the portable multi-tracking system is installed in a vehicle and detects various situations, it can automatically (without human intervention) send an alarm message including the vehicle's location to the other multiple tracked carriers, emergency center or user service provider. Such situations include cases where the vehicle is hit by unidentified sources, the vehicle's window is broken, or the vehicle is towed due to improper parking. The portable multi-tracking system cooperates with the car door anti-theft system. When a thief opens the car door, the portable multi-tracking system sends the vehicle location and emergency message to the other multiple tracked carriers, the emergency center or user service provider. The portable multi-tracking system also triggers a sound alarm to intimidate the thieves.

The emergency center or user service provider can command the portable multi-tracking system to interrupt the fuel supply, and continuously transmit the vehicle's location to the emergency center when it receives a stolen vehicle message from the vehicle.

When the driver loses a car key, after identifying the driver's ID, the user service provider can command the portable multi-tracking system to unlock the car door and start the engine for the driver. When the driver leaves the car without locking the car door, the multi-tracking unit can report to the user service provider. The user service provider can then command the multi-tracking unit to lock the car door for the driver.

The user service provider can monitor several vehicles and coordinate their movement to desired locations on the basis of criteria such as minimum time dispatching or ability to execute desired tasks. The user service provider can monitor the travel status of a vehicle and accordingly inform a waiting station as to the vehicle's anticipated arrival time. Such a capability of the system is useful for various services such as ambulances, taxis, fire trucks, police, security services, guards, etc. The user service provider can also monitor the vehicle's mileage, gas status, coolant, battery, and tire pressure via the portable multi-tracking system. The user service provider also provides vehicle maintenance and repair services.

The portable multi-tracking system is a fully functional cell phone. The user can dial and pick up the phone without a handset by using voice control. The voice-controlled dial function can be set up for multiple telephone numbers.

The portable multi-tracking system detects actuating signals and response properly. The actuating signals are triggered by pushing an emergency button, vehicle maintenance sensors, and sensors for detecting accident, unauthorized unlocking door of the vehicle, unauthorized driving of the vehicle, and violent breaking of windows of the vehicle.

What is claimed is:

1. A multi-tracking method, comprising the steps of
   (a) providing a plurality of portable multi-tracking units, wherein one of said portable multi-tracking units acts as a host unit while the other portable multi-tracking units act as client units;
   (b) providing host position data of said host unit by a positioning unit of said host unit, wherein said host position data contains GPS signal and IMU position information allowing to compensate said GPS signal in areas where GPS signal is not available;
   (c) receiving client position data and client identifications of said client units through a public wireless internet, so as to provide said host unit with client locations of said client units; and
   (d) sending said host position data and a host identification of said host unit to a wireless internet server provider via said public wireless internet, so as to provide said other client units with a host location of said host unit, wherein each of said portable multi-tracking units is capable of having locations of the other portable multi-tracking units.

2. The multi-tracking method, as recited in claim 1, wherein the step (a) further comprises the steps of:

(a.1) retrieving map data from a map database stored in a storage device of each of said portable multi-tracking units to provide a map; and (a.2) displaying said map on a displaying unit of each of said portable multi-tracking units.

3. The multi-tracking method, as recited in claim 2, wherein the step (b) further comprises the steps of:

(b.1) processing said host position data to achieve said host location; and (b.2) displaying said host location of said host unit on said map on said displaying unit of said host unit.

4. The multi-tracking method, as recited in claim 3, wherein the step (c) further comprises the steps of:

(c.1) decoding said client locations received from said client units to achieve said client locations thereof; and (c.2) displaying said client locations of said client units on said map on said displaying unit of said host unit.

5. The multi-tracking method, as recited in claim 4, wherein the step (d) further comprises the steps of:

(d.1) decoding said host location received from said host unit to achieve said host location by each of said client unit; and (d.2) displaying said host location of said host unit on said map on said displaying unit of each of said client units.

6. The multi-tracking method, as recited in claim 5, wherein each of said portable multi-tracking unit comprises a wireless communication module adapted to create and maintain an internet link between said host unit and said client units.

7. The multi-tracking method, as recited in claim 6, further comprising the steps of:

(e) collecting voice data from a microphone of each of said host and client units;

(f) encoding said voice data by a system processor of each of said host and client units;

(g) sending said encoded voice data through said wireless communication module of said host unit to said client units so as to enable each of said client units to access said encoded voice data of said host unit;

(h) receiving said encoded voice data from said wireless communication module of each of said client hosts;

(i) decoding said voice data by said system processor of said host unit; and (j) sending said decoded voice data to a speaker of said host unit so that a host user of said host unit is capable of hearing hear what said client users are talking.

8. The multi-tracking method, as recited in claim 6, further comprising the steps of:

(e') collecting video image from a video camera of each of said host and client units;

(f') encoding said video image by a system processor of each of said host and client units;

(g') sending said encoded video image through said wireless communication module of said host unit to said client units so as to enable each of said client units to access said image data of said host unit;

(h') receiving said encoded video image from said wireless communication module of each of said client hosts;

(i') decoding said video image by said system processor of said host unit and (j') sending said decoded video image to said displaying unit so that a host user of said host unit is capable of viewing what said client users are doing.

9. The multi-tracking method, as recited in claim 7, further comprising the steps of:

(k) collecting video image from a video camera of each of said host and client units;

(l) encoding said video image by said system processor of each of said host and client units;

(m) sending said encoded video image through said wireless communication module of said host unit to said client units so as to enable each of said client units to access said image data of said host unit;

(n) receiving said encoded video image from said wireless communication module of each of said client hosts;

(o) decoding said video image by said system processor of said host unit and (p) sending said decoded video image to said displaying unit so that a host user of said host unit is capable of viewing what said client users are doing.

10. The multi-tracking method, as recited in claim 5, wherein said positioning unit is a GPS receiver.

11. The multi-tracking method, as recited in claim 9, wherein said positioning unit is a GPS receiver.

12. The multi-tracking method, as recited in claim 5, wherein said positioning unit is an IMU positioning device.

13. The multi-tracking method, as recited in claim 9, wherein said positioning unit is an IMU positioning device.

14. The multi-tracking method, as recited in claim 5, wherein said positioning unit is an integrated GPS/IMU device.

15. The multi-tracking method, as recited in claim 9, wherein said positioning unit is an integrated GPS/IMU device.

16. The multi-tracking method, as recited in claim 5, wherein said position data is a three dimensional vector of (x, y, z) coordinates in an Earth-Centered-Earth-Fixed (ECEF) coordinate system.

17. The multi-tracking method, as recited in claim 9, wherein said position data are three dimensional vector of (x, y, z) coordinates in an Earth-Centered-Earth-Fixed (ECEF) coordinate system.

18. The multi-tracking method, as recited in claim 5, wherein said position data include latitude, longitude and altitude coordinates in a Geodetic coordinate system.

19. The multi-tracking method, as recited in claim 9, wherein said position data include latitude, longitude and altitude coordinates in a Geodetic coordinate system.

20. The multi-tracking method, as recited in claim 1, 5 or 8, after the step (a), further comprising a step of receiving user commands from an input device.

21. The multi-tracking method, as recited in claim 20, wherein said user commands include viewing a map, displaying said locations of said client units relative to said host, sending messages, scheduling trip, activating autonomous navigation functionality, and locating an address.

22. The multi-tracking method, as recited in claim 6, wherein said wireless communication module of each of said host unit and client units further receives client identifications and inquiring commands.

23. The multi-tracking method, as recited in claim 7, wherein said wireless communication module of each of said host unit and client units further receives client identifications and inquiring commands.

24. The multi-tracking method, as recited in claim 8, wherein said wireless communication module of each of said host unit and client units further receives client identifications and inquiring commands.

25. The multi-tracking method, as recited in claim 5, further comprising a step of selecting one or more specific client users from said client users by choosing said client identifications of said specific client users to view said client location of said specific client user.

26. The multi-tracking method, as recited in claim 7, further comprising a step of selecting one or more specific client users from said client users by choosing said client identifications of said specific client users to view said client location of said specific client user.

27. The multi-tracking method, as recited in claim 8, further comprising a step of selecting one or more specific client users from said client users by choosing said client identifications of said specific client users to view said client location of said specific client user.

28. The multi-tracking method, as recited in claim 5, further comprising a step of disabling an accessibility of said client location of one or more of said client units.

29. The multi-tracking method, as recited in claim 7, further comprising a step of disabling an accessibility of said client location of one or more of said client units.

30. The multi-tracking method, as recited in claim 8, further comprising a step of disabling an accessibility of said client location of one or more of said client units.

31. The multi-tracking method, as recited in claim 5, wherein a predetermined number of said portable multi-tracking units is grouped to form a user group, wherein said host unit is selected as a group server and said client units are group members, wherein said host unit receives said client locations of said client units and broadcasts said client locations to said client units respectively, while each of said client units only receives said host location from said host unit but does not receive said client locations of said other client units directly, wherein each of said client units receives client locations of said other client units from said host unit.

32. The multi-tracking method, as recited in claim 7, wherein a predetermined number of said portable multi-tracking units is grouped to form a user group, wherein said host unit is selected as a group server and said client units are group members, wherein said host unit receives said client locations of said client units and broadcasts said client locations to said client units respectively, while each of said client units only receives said host location from said host unit but does not receive said client locations of said other client units directly, wherein each of said client units receives client locations of said other client units from said host unit.

33. The multi-tracking method, as recited in claim 8, wherein a predetermined number of said portable multi-tracking units is grouped to form a user group, wherein said host unit is selected as a group server and said client units are group members, wherein said host unit receives said client locations of said client units and broadcasts said client locations to said client units respectively, while each of said client units only receives said host location from said host unit but does not receive said client locations of said other client units directly, wherein each of said client units receives client locations of said other client units from said host unit.

34. The multi-tracking method, as recited in claim 31, wherein more than one user groups are presented and said group servers exchange said host and client locations thereof with each other through said public wireless internet.

35. The multi-tracking method, as recited in claim 32, wherein more than one user groups are presented and said group servers exchange said host and client locations thereof with each other through said public wireless internet.

36. The multi-tracking method, as recited in claim 33, wherein more than one user groups are presented and said group servers exchange said host and client locations thereof with each other through said public wireless internet.

37. A portable multi-tracking system, comprising:

a system processor;

a positioning unit, which is connected to said system processor, providing current host position data of said portable multi-tracking system, wherein said position data contains GPS signal and IMU position information allowing to compensate said GPS signal in areas where GPS signal is not available and includes position, velocity, and heading of said portable multi-tracking system;

a storage device, which is connected to said system processor, storing an electronic map database and other interim data including said host position data and a host identification, wherein map data is capable of being retrieved by said system processor from said electronic map database of said storage device;

a wireless communication module, which is connected with said system processor, for receiving client position data and client identifications of other client portable multi-tracking systems which are linked with said portable multi-tracking system through a public wireless internet, and sending said host position data and said host identification through said public wireless internet to said other client portable multi-tracking systems, so as to provide said portable multi-tracking system with client position data of said other client portable multi-tracking system, and to provide said other client portable multi-tracking systems with said host position data of said portable multi-tracking system; and a display device, which is connected to said system processor, for displaying said map data in form of a map, wherein said map data is retrieved by said system processor from said storage device, moreover said host position data and said client position data are processed in said system processor to form a current host location and client locations respectively, which are overlayingly displayed on said map displayed on said display device.

38. The portable multi-tracking system, as recited in claim 37, wherein said wireless communication module is also arranged for broadcasting said client position data received from said client portable multi-tracking systems.

39. The portable multi-tracking system, as recited in claim 37, further comprising an input device, which is connected to said system processor and acts as an interface for a user to intervene in a system operation of said portable multi-tracking system for inputting said user commands and said interim data.

40. The portable multi-tracking system, as recited in claim 38, further comprising an input device, which is connected to said system processor and acts as an interface for a user to intervene in a system operation of said portable multi-tracking system for inputting said user commands and said interim data.

41. The portable multi-tracking system, as recited in claim 39, wherein said input device is a keyboard.

42. The portable multi-tracking system, as recited in claim 39, wherein said input device is a software keyboard coupled with a character recognition system.

43. The portable multi-tracking system, as recited in claim 39, wherein said input device is a touch screen coupled with corresponding software to identify said user commands.

44. The portable multi-tracking system, as recited in claim 39, wherein said input device is a microphone coupled with a voice recognition system to receive said user commands.

45. The portable multi-tracking system, as recited in claim 39, wherein said system processor is a central processing unit coupled with predetermined interfaces to said display device, said input device, said storage device, said positioning unit, and said wireless communication module, and is responsible for processing sensor positioning data, display processing, input response, remote data or command processing, sending messages, and device control and management.

46. The portable multi-tracking system, as recited in claim 39, wherein said wireless communication module is used to process wireless communication protocol, wireless signal detection, received data conversion, signal data amplification, modulating a digital signal to be transmitted into an analogue signal, and demodulating an analogue signal into a digital signal.

47. The portable multi-tracking system, as recited in claim 46, wherein said wireless communication module further comprises an antenna for converting an analogue signal into a radiative signal and converting a detected radiative signal from each of said client portable multi-tracking systems into an analogue signal which is suitable for said wireless communication module to process.

48. The portable multi-tracking system, as recited in claim 39, wherein said positioning unit is a GPS receiver.

49. The portable multi-tracking system, as recited in claim 39, wherein said positioning unit is an IMU.

50. The portable multi-tracking system, as recited in claim 39, wherein said positioning unit is a combination device of a GPS receiver and an IMU.

51. The portable multi-tracking system, as recited in claim 39, wherein said positioning unit is a land/water vehicle navigator which generates position data.

52. The portable multi-tracking system, as recited claim 44, wherein said microphone, which is connected to said system processor, detects sound wave and converts said sound wave to electrical signal, wherein an electrical presentation of said sound wave is further sampled and converted into digital sound data, which digital sound data is processed by said system processor to compensate noise and reduce data size, and then said digital sound data is encoded and sent to said wireless communication module that broadcasts said encoded digital sound data through said public wireless internet.

53. The portable multi-tracking system, as recited claim 47, further comprising a microphone, which is connected to said system processor, detects sound wave and converts said sound wave to electrical signal, wherein an electrical presentation of said sound wave is further sampled and converted into digital sound data, which digital sound data is processed by said system processor to compensate noise and reduce data size, and then said digital sound data is encoded and sent to said wireless communication module, which broadcasts said encoded digital sound data through said public wireless internet.

54. The portable multi-tracking system, as recited in claim 52, further comprising a speaker, which is connected to said system processor, wherein when said wireless communication module receives said encoded digital sound data through said public wireless internet and sends said encoded digital sound data to said system processor, wherein said system processor decodes said encoded digital sound data and sends said encoded digital sound data to said speaker, which converts said digital sound data to analogue signal and then said analogue signal is converted to sound wave.

55. The portable multi-tracking system, as recited in claim 53, further comprising a speaker, which is connected to said system processor, wherein when said wireless communication module receives said encoded digital sound data through said public wireless internet and sends said encoded digital sound data to said system processor, wherein said system processor decodes said encoded digital sound data and sends said encoded digital sound data to said speaker, which converts said digital sound data to analogue signal and then said analogue signal is converted to sound wave.

56. The portable multi-tracking system, as recited in claim 44, further comprising a video camera, which is connected to said system processor, capturing a video image and converting said video image to digital presentation, wherein said digital presentation of said video image is sent to said system processor to process and encode to encoded video image which is then sent to said wireless communication module for broadcasting through said public wireless internet.

57. The portable multi-tracking system, as recited in claim 47, further comprising a video camera, which is connected to said system processor, capturing a video image and converting said video image to digital presentation, wherein said digital presentation of said video image is sent to said system processor to process and encode to encoded video image which is then sent to said wireless communication module for broadcasting through said public wireless internet.

58. The portable multi-tracking system, as recited in claim 55, further comprising a video camera, which is connected to said system processor, capturing a video image and converting said video image to digital presentation, wherein said digital presentation of said video image is sent to said system processor to process and encode to encoded video image which is then sent to said wireless communication module for broadcasting through said public wireless internet.

59. The portable multi-tracking system, as recited in claim 37, 39, 44, 47, 53, 55, or 58, wherein said system processor includes:
  a user interface module, which is an entry for enabling or disabling a plurality of functions of said portable multi-tracking system, including wireless communication multi-tracking, autonomous navigation, displaying map, locating an address, and scheduling a trip;
  a trip scheduler module for planning and scheduling a trip, including defining a start point, interim points, and an end point, and logging information including visiting time, appointments, contact persons, and comments;
  a street locator module for displaying said map data on said display device and searching a designated place;
  a map viewer module for displaying said host and client position data and enabling a predetermined area of said map to zoom in and;
  an autonomous navigator module for outputting said host position data of said portable multi-tracking system;
  a communication controller module for receiving said host position data of said portable multi-tracking system and combining said host position data with said host identification which are sent to said wireless communication module, wherein said communication controller module also receives information from said client portable multi-tracking systems; and
  a wireless tracking module for receiving said information of said client portable multi-tracking systems sent from said communication controller module for retrieving said client identifications and said client position data which are then send to said map viewer module, wherein said map viewer module displays said client locations of said client portable multi-tracking systems on said map.

60. The portable multi-tracking system, as recited in claim 59, wherein said wireless tracker module further updates said tracking status of said client portable multi-tracking systems of interest at a constant period, alerts when losing track of a specific one of said client portable multi-tracking systems of interest, and alerts for potential collision between said portable multi-tracking system and any of said client portable multi-tracking systems when said multi-tracking system and said client portable multi-tracking systems are carried in aircrafts.

61. The portable multi-tracking system, as recited in claim 59, wherein said autonomous navigator module further tracks and navigates wherever said portable multi-tracking system goes, shows a real-time speed and direction of said portable multi-tracking system, illustrates no-map areas including mountains, lakes, and rivers, gives a warning message when said portable multi-tracking system is brought to travel in a wrong way, allows a two or more points routing, provides street-to-street directions, shows time and distance to destination, and programs avoidable areas.

62. The portable multi-tracking system, as recited in claim 59, wherein said user interface provides an entry for user to select operations including position tracking, voice tracking, and video tracking.

63. The portable multi-tracking system, as recited in claim 59, wherein said wireless communication module comprises a multi-tracking mechanism which includes a start module, an initialization module, a data reception module, a data processing module, a data transmission module, a program termination module, and an end module, wherein said data reception module comprises a position producer data reception module, a communication data reception module and a user input data reception module which are executed in a synchronous fashion and communicate with each other;

wherein said position producer data reception module further comprises a synchronous module, a port data reading module, and a communication module wherein said synchronous module is designed to wait for an event that shows that a new position data is ready without wasting for system processing time;

wherein said communication data reception module further comprises a synchronous event module, a communication port data reading module, a data verification module, an error checking and recovering module, a data transfer module, a send module, and a request module with a remote device, wherein said data transfer module is a type of synchronous module that communicates with a remote data processing module;

wherein said user input data reception module further comprises a synchronous module, a port data reading module, and a communication module, wherein said synchronous module is designed to wait for an event that shows that said new position data is ready without wasting said processing time of said system processor unit to search said port continuously;

wherein said data processing module further comprises a position sensor data processing module, a communication data processing module, and a user input data processing module;

wherein said data transmission module further comprises a synchronous sending request module, a communication port status checking module, a communication command generation module, a communication command sending module, a remote device checking module, a synchronous module to write data to be sent to said output data buffer, and a data sending module.

* * * * *